ly characters(*or enveloped by the wax, the fruits, separately or in combined numbers, are removed from the wax bath.  ...*)

UNITED STATES PATENT OFFICE.

ADDISON F. HOFFMAN, OF NEW CUMBERLAND, WEST VIRGINIA.

PROCESS OF PRESERVING FRUIT.

1,166,588.  Specification of Letters Patent.  Patented Jan. 4, 1916.

No Drawing.  Application filed November 27, 1912. Serial No. 733,894.

*To all whom it may concern:*

Be it known that I, ADDISON F. HOFFMAN, a citizen of the United States, residing at New Cumberland, in the county of Hancock and State of West Virginia, have invented new and useful Improvements in Processes of Preserving Fruit, of which the following is a specification.

My invention relates to a process of preserving fruit.

The invention is applicable to the preserving of fruits of trees, plants, vegetables or the like, and the word "fruit" is to be given this signification where used hereinafter in this specification and appended claims. Also the word "fruit" as used in the specification and claims, may be defined as covering fruit of any vegetable product used as food.

More particularly, the invention relates to a process of preserving fruit in an uncooked state and in a manner or way in which the use of a jar or the equivalent that must be hermetically sealed, is unnecessary.

In carrying out the process, the fruit is first chilled, which is preferably accomplished by placing the same in water maintained at a temperature at about 35° F. in a suitable receptacle. While in this bath, the fruit is sterilized in any approved or suitable manner in order to destroy the bacteria and other micro-organisms of putrefaction.

In effecting sterilization, the fruit in the water bath is chilled by the water which is maintained at about 35° F. as stated. Also while in the water bath, the fruit is subjected to the action of ultra violet rays which may be produced by a suitable mercury lamp. To further and more effectively sterilize the fruit, nascent oxygen is introduced into the water bath. As is obvious, the nascent oxygen may be produced in various ways, as by means of electrolysis, which is probably the preferred way; through the decomposition of carbon-dioxid or carbonic acid gas, or through the generation of ozone. After thus effectively sterilizing the fruit, the same is removed from the water bath and dried while still chilled or cold, the dried fruit is placed or immersed in a bath of molten wax, the temperature of which wax is preferably from 212° F. to 220° F., or above the boiling point of water. The action of this wax bath serves to further sterilize the fruit. After being thoroughly coated or enveloped by the wax, the fruits, separately or in combined numbers, are removed from the wax bath. When removed from the wax bath, by the action of the air upon the wax, the wax is quickly cooled so as to set or harden and thereby hermetically seal the fruit.

By reason of the chilling of the fruit, the skin thereof withstands the action of the heat produced through the melting of the wax, in such a way that the skin is not burned, cooked, broken or otherwise attacked by the heat. After the wax envelop has set or cooled about the fruit, the preserving process has been effectively carried out and the fruit is in condition for shipping or other purposes; it being wrapped and suitably packed in boxes or the equivalent, as is obvious.

Having thus described my said invention, what I claim as new and desire to secure by Letters Patent is:—

1. The process of preserving fruit consisting in chilling the fruit in a bath of a temperature lower than the temperature of the fruit to offset the injurious effect of heat from an enveloping coating to be applied thereto, and in rendering the fruit antiseptic, and thereafter applying an enveloping coating at a temperature normally injurious to the fruit.

2. The process of preserving fruit consisting in chilling the fruit to offset the injurious effect of heat from an enveloping coating to be applied thereto, and in sterilizing the fruit, and thereafter applying to the fruit an enveloping coating at a temperature normally injurious to the fruit.

3. The process of preserving fruit consisting in subjecting the fruit to the action of a bath at a temperature lower than the temperature of the fruit to chill the fruit to offset the injurious effect of heat from an enveloping coating to be applied thereto, rendering the fruit antiseptic while in said bath, and thereafter applying to the fruit an enveloping coating at a temperature normally injurious to the fruit.

4. The process of preserving fruit consisting in subjecting the same to the action of a cooling medium of a temperature approximately as low as 35° F., to chill the fruit, then rendering the fruit antiseptic, afterward coating the fruit with a soluble coating while in a heated and molten state, and then permitting the coating to be chilled by contact with the air to thereby form a hermetic envelop or coating on the fruit.

5. The process of preserving fruit consisting in placing the same in a water bath of a temperature lower than the temperature of the fruit, sterilizing the fruit while in such bath through the action of oxygen, and afterward applying an envelop thereto.

6. The process of preserving fruit consisting in placing the same in a bath of water of a temperature, approximately as low as 35° F. to chill the fruit, sterilizing the fruit while in such bath, afterward placing the fruit in a bath of mineral fat in a heated and molten state, then removing the fruit whereby the same is chilled by contact with the air to thereby form a hermetic envelop on the fruit.

ADDISON F. HOFFMAN.

Witnesses:
A. W. ATTERHOLT,
B. H. COOPER.